US009093005B2

(12) United States Patent
Mizumukai

(10) Patent No.: US 9,093,005 B2
(45) Date of Patent: Jul. 28, 2015

(54) DISPLAY DEVICE

(75) Inventor: Wataru Mizumukai, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1670 days.

(21) Appl. No.: 12/076,375

(22) Filed: Mar. 18, 2008

(65) Prior Publication Data

US 2008/0235571 A1 Sep. 25, 2008

(30) Foreign Application Priority Data

Mar. 22, 2007 (JP) ................................ 2007-074635
Jan. 18, 2008 (JP) ................................ 2008-008684

(51) Int. Cl.
*G06F 17/00* (2006.01)
*G09G 3/00* (2006.01)
*G03G 15/00* (2006.01)

(52) U.S. Cl.
CPC ................ *G09G 3/00* (2013.01); *G03G 15/502* (2013.01); *G09G 2340/145* (2013.01)

(58) Field of Classification Search
CPC ........................... H04L 51/22; H04M 1/72552
USPC .................. 715/273, 200, 246, 255, 259, 261
See application file for complete search history.

(56) References Cited

U.S. PATENT DOCUMENTS 5,027,154 A * 6/1991 Ujiie et al. ...................... 355/77
5,620,264 A * 4/1997 Kagita ........................... 400/74
5,623,406 A * 4/1997 Ichbiah ............................ 704/3
5,740,336 A * 4/1998 Wakisaka et al. ............ 358/1.14
5,875,405 A * 2/1999 Honda .......................... 455/564
5,914,788 A * 6/1999 Tomida ......................... 358/434
6,078,400 A * 6/2000 Mizutani ...................... 358/1.14
6,279,018 B1 * 8/2001 Kudrolli et al. ............... 715/234
6,314,249 B1 * 11/2001 Lay et al. ........................ 399/11
6,666,594 B2 * 12/2003 Parry .............................. 400/74
7,173,724 B2 * 2/2007 Nomura et al. .............. 358/1.15
7,255,501 B2 * 8/2007 Arai ................................ 400/74

(Continued)

FOREIGN PATENT DOCUMENTS

JP 6052018 A 2/1994
JP 9222887 A 8/1997

(Continued)

OTHER PUBLICATIONS

Japanese Office Action issued Oct. 25, 2011, in the counterpart Japanese patent application 2008-008684 (7 pages total).

*Primary Examiner* — Manglesh M Patel
(74) *Attorney, Agent, or Firm* — Banner & Witcoff, Ltd.

(57) ABSTRACT

A display device includes a display area displaying information therein, an information storing unit storing therein a plurality of pieces of predetermined information displayable in the display area, an abbreviation storing unit storing therein an abbreviation corresponding to each of the predetermined information, an information detecting unit configured to detect first information of the predetermined information as a subject to be displayed in the display area, a judging unit judging whether the first information includes a plurality of pieces of information, and a first control unit configured to acquire each of the first information and an abbreviation thereof from the information storing unit and the abbreviation storing unit, respectively, and to display each of the first information and the abbreviation thereof in the display area, in case where it is judged that the first information includes a plurality of pieces of information.

7 Claims, 8 Drawing Sheets

331 ERROR DISPLAY MEMORY 3311 3312 3313

| ERROR TITLE | ABBREVIATION | OPERATION INFORMATION |
|---|---|---|
| Jam Inside | JI | Open the Front Cover, pull out the Drum Cartridge completely and remove the jammed paper. |
| Toner Life End | TLE | Replace the Toner Cartridge. |
| Waste Toner Full | WTF | Replace the Waste Toner Box. Refer to the User's Guide for how to do it. |

(56) References Cited

U.S. PATENT DOCUMENTS

| | | | | |
|---|---|---|---|---|
| 7,274,473 | B2 * | 9/2007 | Parry | 358/1.14 |
| 7,827,315 | B2 * | 11/2010 | Kirkland | 709/247 |
| 8,595,630 | B2 * | 11/2013 | Adams et al. | 715/752 |
| 2003/0028603 | A1 * | 2/2003 | Aktas et al. | 709/206 |
| 2005/0240391 | A1 * | 10/2005 | Lekutai | 704/2 |
| 2006/0223576 | A1 * | 10/2006 | Macaluso | 455/552.1 |
| 2007/0070398 | A1 * | 3/2007 | Oshima | 358/1.15 |
| 2008/0240827 | A1 * | 10/2008 | Yamazaki | 400/73 |

FOREIGN PATENT DOCUMENTS

| | | |
|---|---|---|
| JP | 10240206 A | 9/1998 |
| JP | 2006-126503 | 5/2006 |
| JP | 2006-181967 | 7/2006 |

* cited by examiner

331 ERROR DISPLAY MEMORY 3311 3312 3313

| ERROR TITLE | ABBREVIATION | OPERATION INFORMATION |
|---|---|---|
| Jam Inside | JI | Open the Front Cover, pull out the Drum Cartridge completely and remove the jammed paper. |
| Toner Life End | TLE | Replace the Toner Cartridge. |
| Waste Toner Full | WTF | Replace the Waste Toner Box. Refer to the User's Guide for how to do it. |

FIG. 3

DISPLAY DEVICE

CROSS-REFERENCE TO RELATED APPLICATION

This application claims priority under 35 U.S.C. §119 from Japanese Patent Applications No. 2007-074635 filed on Mar. 22, 2007, and No. 2008-008684 filed on Jan. 18, 2008. The entire subject matters of the applications are incorporated herein by reference.

BACKGROUND

1. Technical Field

The following description relates to one or more display devices that allow a user to quickly grasp more information with less operations even in a limited display area.

2. Related Art

Conventionally, there has been known a technique in which abbreviated texts are displayed in a list form on an LCD display unit, and then by selecting one of the abbreviated texts through an operating unit, a complete text corresponding to the abbreviated text as selected is displayed (for example, see Japanese Patent Provisional Publication No. 2006-126503, hereinafter which is simply referred to as '503 Publication). It is noted that, according to '503 Publication, when the complete text can not be displayed within a screen area of the LCD display unit, the complete text is displayed in a scrolled manner.

SUMMARY

However, according to the technique disclosed in '503 Publication, the operation of displaying the complete text can be performed only for the abbreviated text as selected. Therefore, it is unfortunate that, when a user wishes to grasp what each of the abbreviated texts as displayed represents, the user has to select it on a one-by-one basis to display the complete text thereof.

Aspects of the present invention are advantageous in that there can be provided one or more improved display devices that allow a user to quickly grasp more information with fewer operations even in a limited display area.

According to aspects of the present invention, there is provided a display device, which includes a display area configured to display information therein, an information storing unit configured to store therein a plurality of pieces of predetermined information displayable in the display area, an abbreviation storing unit configured to store therein an abbreviation corresponding to each of the predetermined information stored in the information storing unit, an information detecting unit configured to detect first information of the predetermined information as a subject to be displayed in the display area, a judging unit configured to judge whether the first information detected by the information detecting unit includes a plurality of pieces of information, and a first control unit configured to acquire each of the first information and an abbreviation thereof from the information storing unit and the abbreviation storing unit, respectively, and to display each of the first information and the abbreviation thereof in the display area, in case where it is judged by the judging unit that the first information includes a plurality of pieces of information.

In some aspects of the present invention, when there are a plurality of pieces of information to be displayed in the display area of the display device, there are displayed in the display area, each of the information to be displayed and an abbreviation corresponding to each of the information to be displayed. Thus, the user can recognize that the information as displayed includes a plurality of pieces of information based on the abbreviations as displayed, and also recognize what each of the information (abbreviations) represents. Hence, the user can quickly grasp more information with fewer operations even in a limited display area.

According to another aspect of the present invention, there is provided a display device, which includes a display area configured to display information therein, an information storing unit configured to store therein a plurality of pieces of predetermined information displayable in the display area, an information detecting unit configured to detect display information of the predetermined information as a subject to be displayed in the display area, a first judging unit configured to judge whether the display information detected by the information detecting unit includes a plurality of pieces of information, and a first controller configured to acquire the display information from the information storing unit, and to display the display information and a numerical number of the display information in the display area, in case where it is judged by the first judging unit that the display information includes a plurality of pieces of information.

In some aspects, when there are a plurality of pieces of information to be displayed in the display area of the display device, there are displayed in the display area, the information to be displayed and the numerical number of the information to be displayed. Thus, the user can recognize the numerical number of the information, and also recognize what the information represents. Therefore, the user can quickly grasp more information with fewer operations even in a limited display area.

BRIEF DESCRIPTION OF THE ACCOMPANYING DRAWINGS

FIG. 3 schematically shows a configuration of an error display memory in the first embodiment according to one or more aspects of the present invention.

Figure 4A:
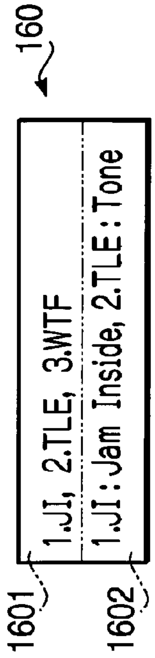

FIG. 4A is an example of an abbreviation display screen image displayed on an LCD when a plurality of errors are caused in the first embodiment according to one or more aspects of the present invention.

Figure 4B:
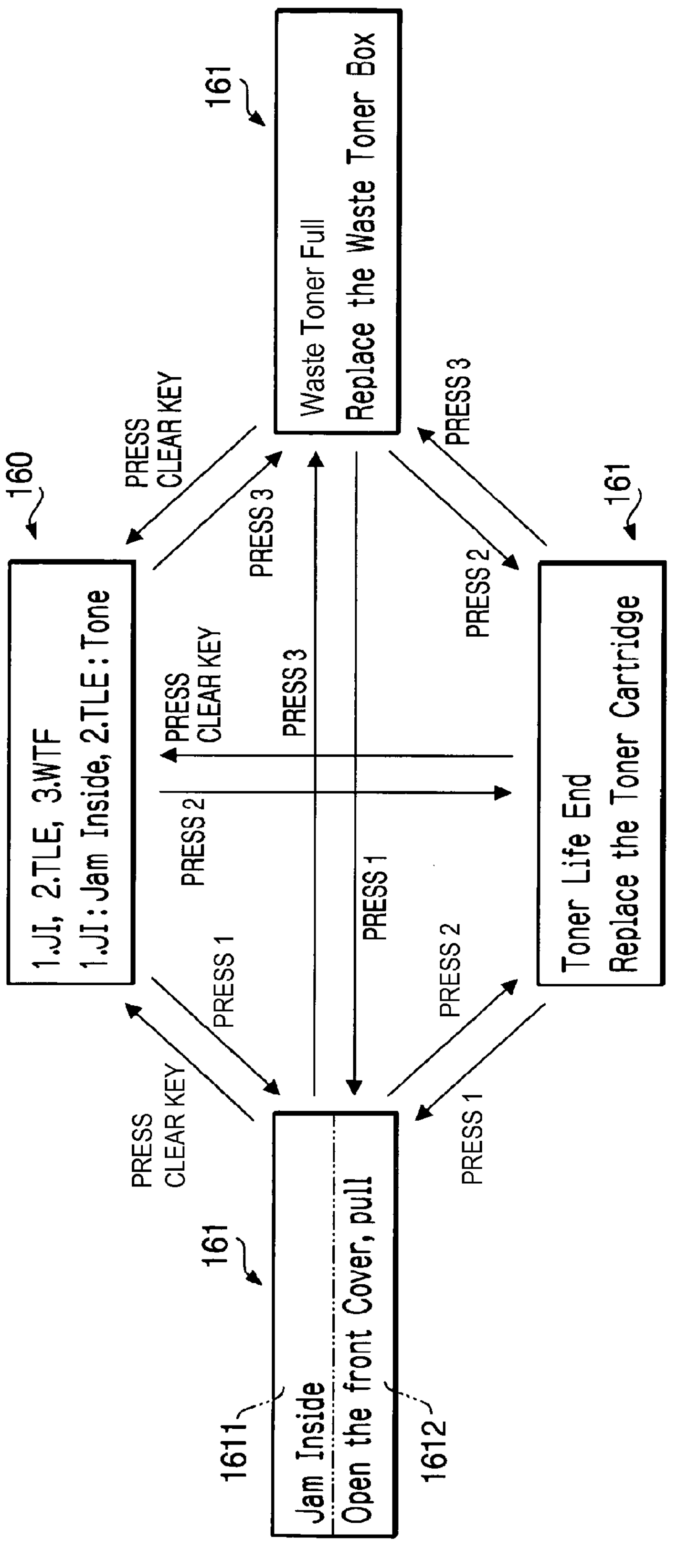

FIG. 4B schematically shows how a screen image displayed on the LCD in case where the plurality of errors are caused is switched in the first embodiment according to one or more aspects of the present invention.

Figure 5:
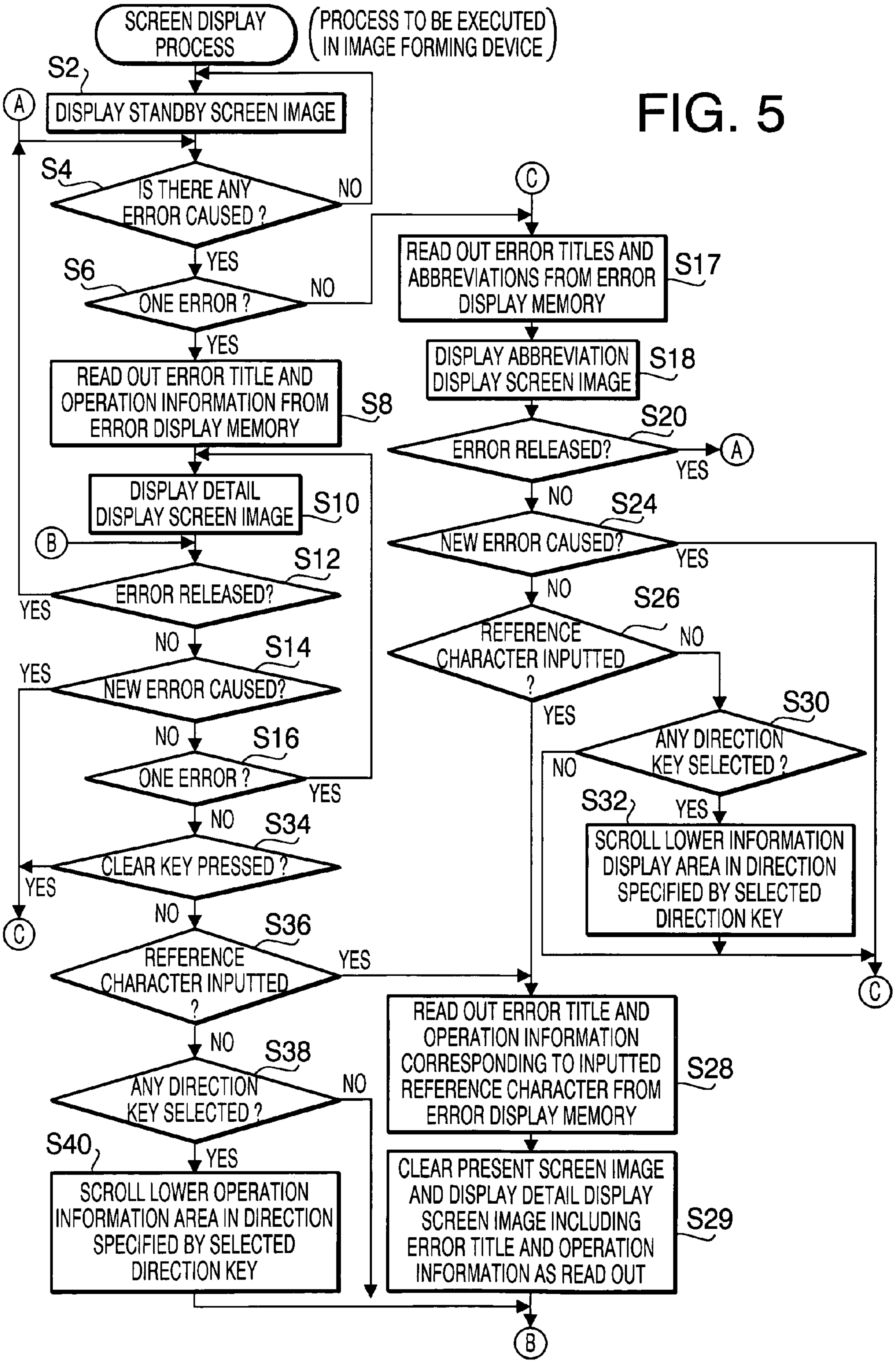

FIG. 5 is a flowchart showing a screen display process to be executed in the image forming device in the first embodiment according to one or more aspects of the present invention.

Figure 6A:
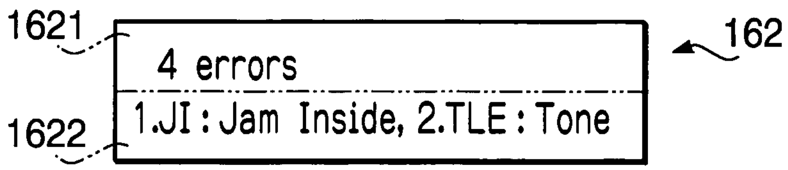

FIG. 6A is an example of a simplified display screen image displayed on an LCD of an image forming device in a second embodiment according to one or more aspects of the present invention.

Figure 6B:
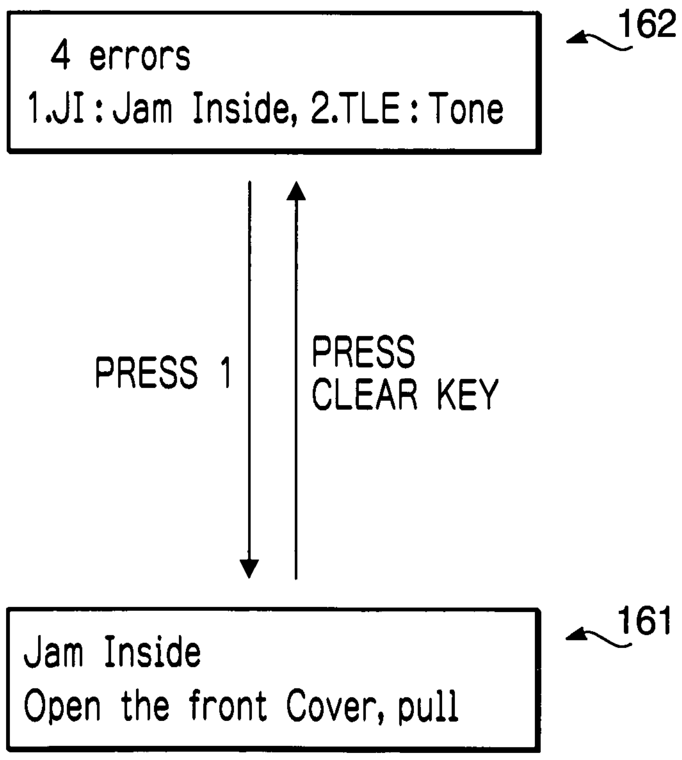

FIG. 6B schematically shows how a screen image displayed on the LCD is switched between the simplified display screen image and detail display screen image in the first embodiment according to one or more aspects of the present invention.

Figure 7:
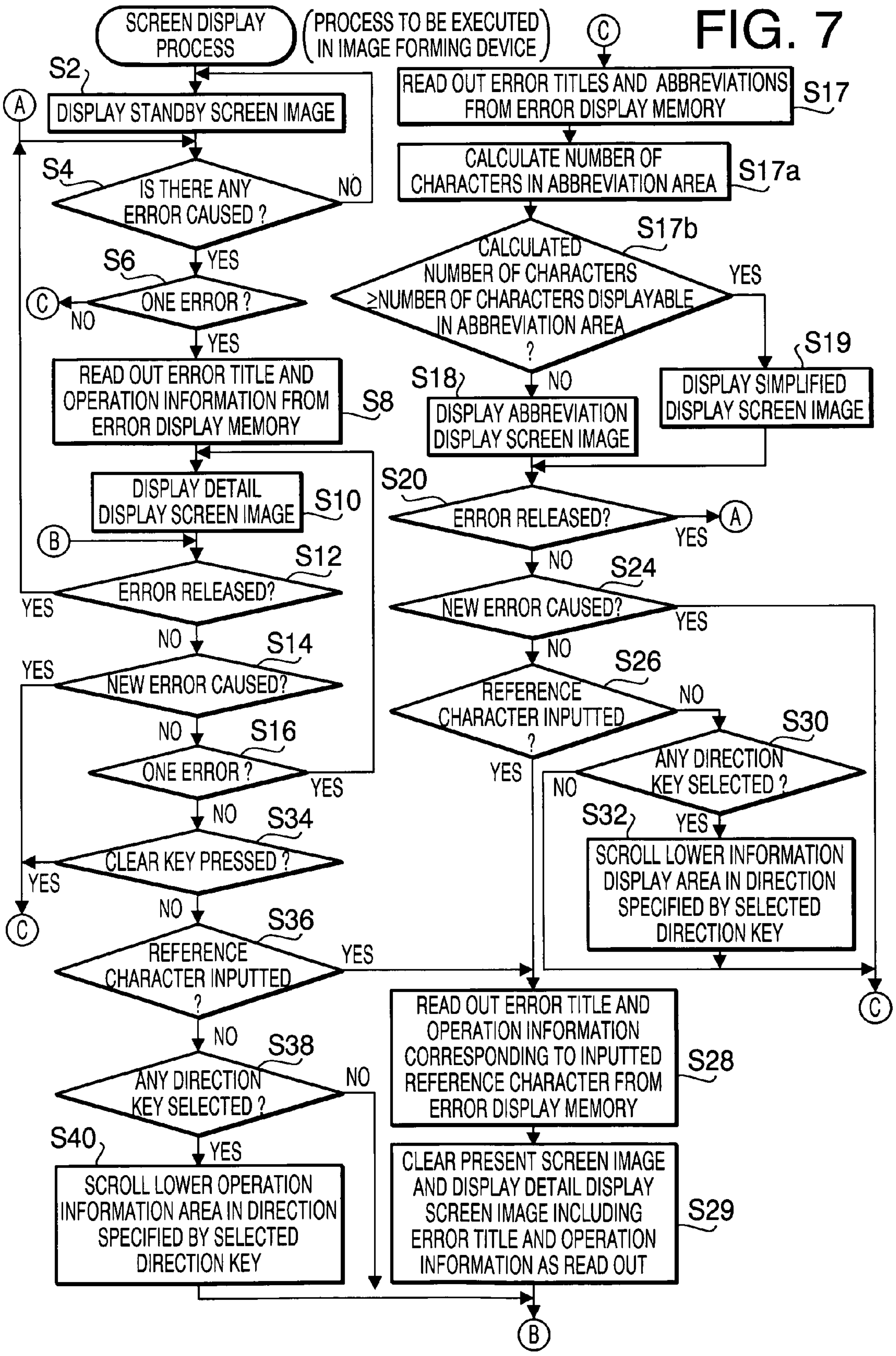

FIG. 7 is a flowchart showing a screen display process to be executed in the image forming device in the second embodiment according to one or more aspects of the present invention.

Figure 8:
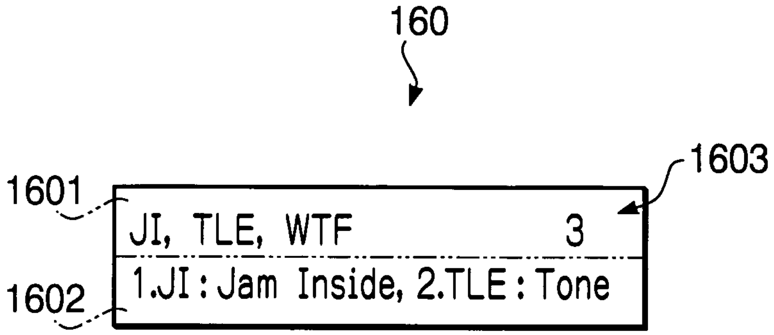

FIG. 8 schematically shows an abbreviation display screen image in a modification according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Figure 1:
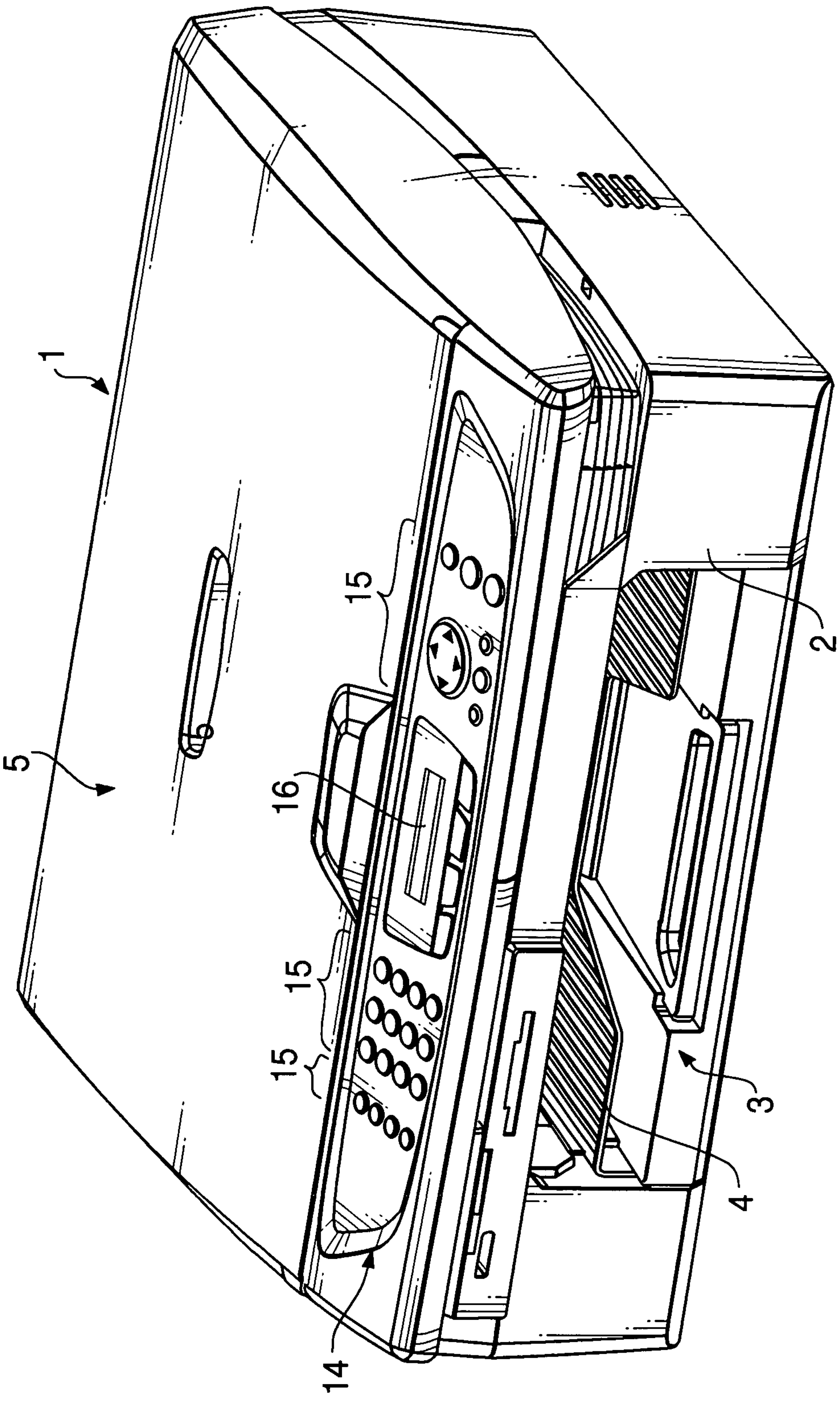
FIG. 1 is an external view of an image forming device in a first embodiment according to one or more aspects of the present invention.

Hereinafter, embodiments according to aspects of the invention will be described with reference to the accompanying drawings. FIG. 1 is an external view of an image forming device 1 as an example of a display device in a first embodiment. As shown in FIG. 1, the image forming device 1 includes a main body 2 formed substantially in a box shape, paper feed cassette 3 provided at a lower side of an opening of the main body 2, catch tray 4 onto which a recording paper with an image formed thereon is ejected.

On an upper face of the main body 2, there is provided an operation panel 14. In a center of the operation panel 14, there is provided a liquid crystal display 16 (hereinafter, referred to as an LCD 16), which displays thereon various messages such as an operation command message in execution of printing, message required for each function of the image forming device 1, and below-mentioned error message that warns a user of occurrence of an error.

At both sides of the LCD 16, there are provided input keys 15 through which a user input is accepted. The input keys 15 include a numeric keypad provided with numeric buttons of "0" to "9," asterisk button, sharp button, clear key for terminating an operation in execution, start key for starting an operation, and direction keys for specifying a direction in which a display on the LCD 16 is scrolled. By operating the input keys 15 as required, the image forming device 1 can be operated.

The image forming device 1 is configured with a so-called laser printer, which includes an image forming unit 20, transfer unit 21 that transfers an image formed by the image forming unit 20 onto the recording paper, and fixing unit 22 that fixes the image transferred onto the recording paper through heating and pressing (see FIG. 2, in which any of the aforementioned units is shown), so that the image can be formed on the recording paper as fed.

Figure 2:
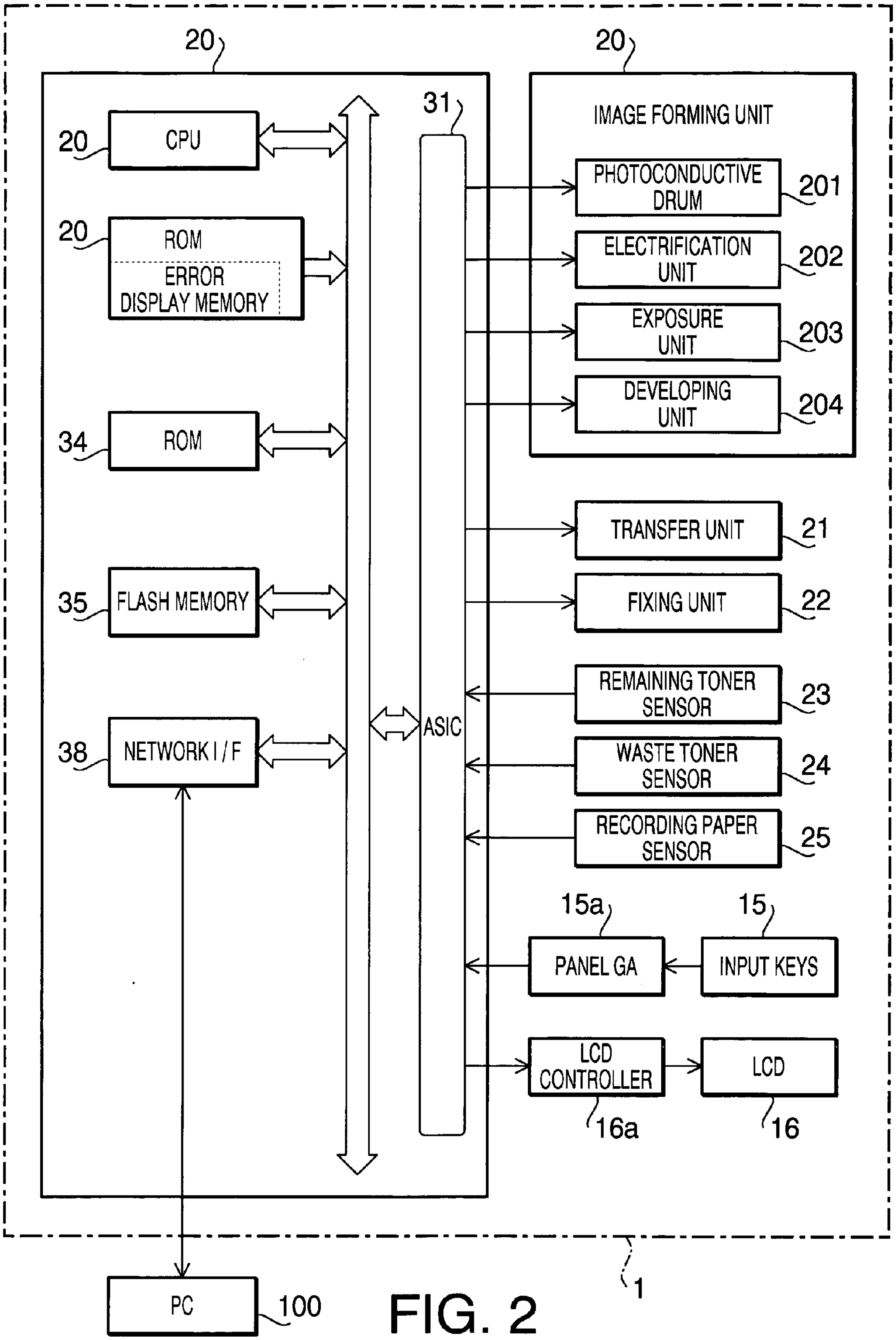
FIG. 2 is a block diagram showing a major electrical configuration of the image forming device in the first embodiment according to one or more aspects of the present invention.

Subsequently, referring to FIG. 2, an electric configuration of the image forming device 1 will be described. FIG. 2 is a block diagram showing a major electric configuration of the image forming device. As shown in FIG. 2, the image forming device 1 has a control unit 30 that takes overall control of each unit of the image forming device 1. An ASIC 31 included in the control unit 30 is connected with the image forming unit 20, transfer unit 21, and fixing unit 22. Further, the ASIC 31 is connected with a remaining toner sensor 23, waste toner detecting sensor 24, recording paper sensor 25, panel gate array 15*a*, and LCD controller 16*a*.

The control unit 30 includes a CPU 32, ROM 33, RAM 34, flash memory 35, and network interface 38 (hereinafter, referred to as a network I/F 38) as well as the ASIC 31. Each of the CPU 32, ROM 33, RAM 34, flash memory 35, and network I/F 38 is connected with the ASIC 31 via a bus line.

The CPU 32 is a microprocessor that executes various programs stored on the ROM 33. The ROM 33 is a read-only memory that stores thereon the various programs to be executed by the CPU 32, and constant values and tables that are referred to in case where the programs are executed. Further, the ROM 33 is provided with an error display memory 331. It is noted that details of the error display memory 331 will be described later with reference to FIG. 3.

The RAM 34 is a memory with a work area to temporarily store parameters when the various programs are executed by the CPU 32. The flash memory 35 is a rewritable memory configured to store various kinds of data in a state where the image forming device 1 is powered on, and to hold the data after the image forming device 1 is powered off.

The ASIC 31 is an integrated circuit configured to convert a command issued by the CPU 32 into a signal for driving each unit and output the converted signal. Further, the ASIC 31 converts a signal outputted by a panel GA 15*a*, and transmits the converted signal to the CPU 32.

The image forming unit 20 is provided with a photoconductive drum 201, electrification unit 202, exposure unit 203, and developing unit 204. The photoconductive drum 201 is a drum on a surface of which a toner image is formed. The electrification unit 202 is configured to charge the surface of the photoconductive drum 201 evenly and positively. The exposure unit 203 is configured to illuminate laser light on the surface of the photoconductive drum 202, and provided with laser oscillators (not shown) each of which emits laser light. The developing unit 204 includes a developing roller to provide attachment for toner onto the photoconductive drum 201, and a supply roller to provide attachment for toner onto the developing roller.

The transfer unit 21 is provided with a transfer roller to transfer the toner image supported by the photoconductive drum 201 onto the recording paper, and connected with the ASIC 26. By applying a negative electrical potential to the transfer roller, the positively charged toner as supported by the photoconductive drum 201 can be transferred onto the recording paper.

The fixing unit 22 includes a heating roller to heat the toner transferred onto the recording paper, and a pressing roller to press the recording paper between the heating roller and the pressing roller. By the fixing unit 22 configured in this manner, the toner transferred onto the recording paper is fixed.

The remaining toner sensor 23 is configured with an LED and phototransistor so as to detect an amount of remaining toner. Detecting light emitted by the LED goes into an internal space of a toner chamber (not shown) through a transparent port. Then, when a small amount of toner is left in the toner chamber, a large intensity of detecting light is received by the phototransistor, since the detecting light is not blocked by the toner so much. Meanwhile, when the toner chamber is filled with a large amount of toner, a small intensity of detecting light is received by the phototransistor, since the detecting light is blocked by the toner. Thus, the remaining toner sensor 23 can detect the remaining amount of the toner based on the intensity of the detecting light received by the phototransistor. When the remaining amount of the toner as detected by the remaining toner sensor 23 is equal to or less than a predetermined threshold, error information is displayed on the LDC 16 such that the user is induced to exchange a toner cartridge.

The waste toner detecting sensor 24 is placed inside a waste toner box (not shown) provided in the main body 2 to house waste toner collected by cleaning, so as to detect the amount of the waste toner held in the waste toner box. When the amount of the waste toner detected by the waste toner detecting sensor 24 is equal to or more than a predetermined threshold, error information is displayed on the LCD 16 such that the user is induced to exchange the waste toner box.

The recording paper sensor 25 is configured to detect occurrence of paper jam caused, for example, with a recording paper being wound around a roller. When the occurrence of paper jam is detected by the recording paper sensor 25, error information is displayed on the LCD 16, such that the user is induced to remove the recording paper.

The panel GA 15*a* is configured to control the input keys 15 through which an input for giving an intended instruction to the image forming device 1 is accepted. The panel GA 15*a* is connected not only with the input keys 15 but with the ASIC 31 as well. The panel GA 15*a* detects an input through the input keys 15 and transmits a predetermined code signal to the ASIC 31.

The LCD controller 16*a* controls the LCD 16 to display thereon information regarding an operation of the image forming device 1. The LCD controller 16*a* is connected with the ASIC 31 and LCD 16.

The network I/F 38 is an interface configured to perform data communication, and connected with the ASIC 31 and PC 100. The network I/F 38 converts image information received from the PC 100, and transmits the converted image information to the CPU 32.

Referring to FIG. 3, the error display memory 331 will be described. FIG. 3 schematically shows a configuration of the error display memory 331. As shown in FIG. 3, the error display memory 331 is a memory configured to store thereon an error title 3311, abbreviation 3312 of the error title, and operation information 3313 for each error that might be caused in the image forming device 1.

The error title 3311 is information representing what kind of error is caused. The abbreviation 3312 is information that represents a corresponding error title 3311 in an abbreviated form. The operation information 3313 is information representing how to operate the image forming device 1 so as to release the error. For example, an error title "Jam Inside" is associated with operation information "Open the Front Cover, pull out the Drum Cartridge completely and remove the jammed paper."

In addition, an error title "Toner Life End" is associated with operation information "Replace the Toner Cartridge." Furthermore, an error title "Waste Toner full" is associated operation information "Replace the Waste Toner Box. Refer to the User's Guide for how to do it." When the occurrence of the error is detected, error information regarding the caused error is read out from the error display memory 331, and displayed on the LCD 16. Thereby, the user is warned of the caused error.

It is noted that only three kinds of errors have been described with the respective error titles, abbreviations, and operation information thereof shown in FIG. 3 for the sake of easy understanding. However, information stored in the error display memory 331 is not limited to the aforementioned information, and may further include information regarding various other errors.

Referring to FIG. 4, the error information displayed on the LCD 16 will be described. FIG. 4A is an example of an abbreviation display screen image 160 displayed on the LCD 16 when two or more errors are caused. As shown in FIG. 4A, the abbreviation display screen image 160 shows the error information read out from the error display memory 331 (see FIG. 3). A display area on the LCD 16 is divided into an upper abbreviation area 1601 to display the abbreviations 3312 and a lower information display area 1602 to display the error titles 3311. The abbreviation display screen image 160 displays the error titles of the currently-caused errors and the abbreviations corresponding to the error titles in substantially all of the display area on the LCD 16.

As shown in FIG. 4A, since each of the abbreviations "JI," "TLE," and "WTF" has a small number of characters, even though a plurality of errors are caused, the abbreviations of all errors caused can concurrently be displayed side by side. Thus, the user can grasp the plurality of caused errors even in the limited display area, at a glance, without particular operations. Thereby, the user can quickly take an appropriate action for each error. In addition, since the error titles corresponding to the abbreviations are displayed on the lower information display area 1602, the user can visually recognize the error titles at the same time as the abbreviations. Therefore, the user can quickly grasp a lot of information even in the limited display area.

In the meantime, each of the error titles displayed in the information display area 1602 has a larger number of characters than a corresponding abbreviation. Hence, when a plurality of errors are caused, all the plurality of errors may not concurrently be displayed. In the present embodiment, when either a left direction or right direction is specified through the direction keys of the input keys 15 while the abbreviation display screen image 160 is displayed on the LCD 16, the information in the information display area 1602 is displayed in a manner scrolled in the specified direction. Thus, all text of the error titles can be displayed even in the limited display area. Therefore, it is more user-friendly for a user who cannot grasp what kind of error is caused only with a corresponding abbreviation. Further, since the lower information display area 1602 is only scrolled, the user has only to perform simpler operations than those would be done if an upper area and lower area were independently scrolled. Hence, it results in that the user can easily operate and view the abbreviation display screen image 160.

As shown in FIG. 4A, there is displayed in the information display area 1602, all text of at least one error title and at least part of another error title. The user may understand what kind of error is caused based on part of an error title. In such a case, the user can quickly grasp a lot of information.

FIG. 4B shows how the screen image displayed on the LCD 16 in case where the plurality of errors are caused is switched. Firstly, when the occurrence of a plurality of errors is detected, the abbreviation display screen image 160 is displayed on the LCD 16. Thereby, the user can visually recognize the number of the caused errors and abbreviations of error titles corresponding to the caused errors. The display of the abbreviation display screen image 160 is good enough for a user who can grasp what kinds of errors are caused and quickly understand how to release the errors from the abbreviations and the error titles displayed in the lower information display area 1602. However, some users may not grasp what kinds of errors are caused from the abbreviations. In addition, some user may not understand how to release the errors from the abbreviations. In such cases, in the present embodiment, in response to a user's operation, the abbreviation display screen image 160 is deleted, and instead a detail display screen image 161 is displayed on the LCD 16.

As shown in FIG. 4B, in the abbreviation display screen image 160 displayed on the LCD 16, a reference character is displayed in a manner associated with each abbreviation in an initial state. For example, in the abbreviation display screen image 160, an abbreviation "IJ" is associated with a reference character "1." Additionally, an abbreviation "TLE" is associated with a reference character "2." Further, an abbreviation "WTF" is associated with a reference character "3." In response to one of the reference characters being inputted by the user, detailed information of an abbreviation corresponding to the inputted reference character is displayed as the detail display screen image 161.

For example, when "1" is inputted through the input keys 15 in a state where the abbreviation display screen image 160 is displayed, the detail display screen image 161 regarding the abbreviation "IJ" is displayed. Additionally, when "2" is inputted through the input keys 15 in the same state, the detail display screen image 161 regarding the abbreviation "TLE" is displayed. Furthermore, when "3" is inputted through the input keys 15 in the same state, the detail display screen image 161 regarding the abbreviation "WTF" is displayed.

Thus, the user can understand the meaning of a reference character corresponding to an abbreviation on the abbreviation display screen image 160. In addition, by inputting the reference character, it is possible to display required information in the display area, quickly and easily.

Further, while any detail display screen image 161 is being displayed, with another reference character being inputted, the present detail display screen image is changed to a detail display screen image 161 corresponding to the inputted reference character. Thereby, in case of a plurality of errors, it is possible to make the user visually recognize detailed information regarding each of the errors, quickly and easily.

Furthermore, in response to the clear key of the input keys 15 being pressed while the detail display screen image 161 is being displayed, the present display on the LCD 16 is switched from the detail display screen image 161 to the abbreviation display screen image 160. Thereby, when the user wishes to reconfirm all errors that are currently occurring, or to know a reference character to make an intended detail display screen image 161 display, the user can again refer to the detail display screen image 160 quickly and easily.

Additionally, as shown in FIG. 4B, the detail display screen image 161 has an upper error title area 1611 to display an error title and a lower operation information area 1612 to display operation information into which the display area on the LCD 16 is divided. The operation information in the operation information area 1612 has a larger number of characters to be displayed than the error title. Therefore, in some cases, all the operation information may not be displayed at a time. In the present embodiment, in case where either the left direction key or right direction key of the input keys 15 is selected while the detail display screen image 161 is being displayed on the LCD 16, the display in the operation information area 1612 is scrolled in a direction specified by the selected direction key. Thereby, all the operation information can conveniently be displayed even in such a limited display area. Additionally, since the lower operation information area 1612 is only scrolled, necessary the user is required to perform simpler and easier operations, and can more easily recognize what the display on the LCD 16 represents, than those that would be required if the upper area and lower area were separately scrolled.

It is noted that although a numerical number is used as the "reference character" in the present embodiment, the reference character is not limited to the numerical number. As long as the reference character is information that the user can input through the input keys 15, any symbol or character may be associated with the abbreviation.

Referring to FIG. 5, a screen display process to be executed in the image forming device 1 will be explained. FIG. 5 is a flowchart showing the screen display process.

Firstly, a standby screen image representing no error caused is displayed on the LCD 16 (S2). Next, it is judged whether an error is caused, based on signals outputted by the remaining toner sensor 23, waste toner detecting sensor 24, and recording paper sensor 25 (regarding all the above sensors, see FIG. 2), and another signal to detect the error (S4). Next, it is judged whether the error as detected includes just a single error (S6).

When it is judged that the error as detected includes just a single error (S6: Yes), an error title and operation information of the caused error are read out from the error display memory 331 (S8). Then, the detail display screen image 161 (see FIG. 4) is displayed (S10). To be more concrete, as described with reference to FIG. 4, the detail display screen image 161 is configured to be displayed in response to the reference character being inputted by the user. However, when the caused error includes just a single error, regardless of whether the reference character is inputted by the user, the detail display screen image 161 is displayed. Thereby, even though the user performs no special operation, the user can get necessary information. Subsequently, it is judged whether the error is released, based on the signals outputted by the remaining toner sensor 23, waste toner detecting sensor 24, and recording paper sensor 25 (S12).

When it is not judged that the error is released (S12: No), it is judged whether a new error is caused, based on signals from outputted by the remaining toner sensor 23, waste toner detecting sensor 24, and recording paper sensor 25 (S14). When it is judged that a new error is caused (S14: Yes), the present process goes to a below-mentioned step S17.

Meanwhile, when it is judged that a new error is caused (S14: No), it is judged whether the new error as detected includes just a single error (S16). When it is judged that the new error as detected includes just a single error (S16: Yes), the present process goes to S10, and the detail display screen image 161 is kept being displayed. Thus, while the steps S10 to S16 are repeated, in case where the error is released (S12: Yes), the present process goes back to S4.

Subsequently, there will be described a case where it is judged that an error is caused (S4: Yes) and that the caused error includes two or more errors (S6: No). In this case (S6: No), an abbreviation and error title of each error as caused are read out from the error display memory 331 (S17). Then, the abbreviation display screen image 160 (see FIG. 4), which includes the abbreviations and error titles as read out, is displayed on the LCD 16 (S18). Next, it is judged whether the errors are released (S20).

When it is not judged that the errors are released (S20: No), it is judged whether a new error is caused, based on the signals outputted by the remaining toner sensor 23, waste toner detecting sensor 24, and recording paper sensor 25 (S24). When it is judged that a new error is caused (S24: Yes), the present process goes back to S17, in which an abbreviation and error title of the new error are read out from the error display memory 331, and the abbreviation display screen image 160 is displayed on the LCD 16 with the abbreviation and error title as read out being added thereto.

Meanwhile, when it is not judged that a new error is caused (S24: No), it is judged whether a reference character is inputted by the user (S26). When it is not judged that a reference character is inputted by the user (S26: No), it is judged whether either the left direction key or right direction key of the input keys 15 is selected (S30).

When it is judged that either the left direction key or right direction key of the input keys 15 is selected (S30: Yes), the display in the lower display information area 1602 (see FIG. 4A) on the abbreviation display screen image 160 is scrolled in a direction specified by the selected direction key. Then, the present process goes back to S17.

Meanwhile, when it is not judged that either the left direction key or right direction key of the input keys 15 is selected (S30: No), the step S 32 is skipped, and the present process goes back to S17 with keeping on displaying the abbreviation display screen image 160.

In case where a reference character is inputted by the user (S26: Yes) while the above steps of S17 to S26, S30, and S32 are repeated, an error title and operation information corresponding to the inputted reference character are read out from the error display memory 331(S28). Thereafter, the present display are erased, and the detail display screen image 161 with the error title and operation information as read out are displayed on the LCD 16 (S29). Then, the present process goes to S12.

In this case, if the error is not released (S12: No), and any new error is not caused (S14: No), the detected error includes two or more errors (S16: No). Therefore, subsequently, it is judged whether the clear key of the input keys 15 is selected (S34). When it is judged that the clear key is selected (S34: Yes), the preset process goes to S17, in which the abbreviation display screen image 18 is displayed (S18).

Meanwhile, when it is not judged that the clear key is selected (S34: No), it is judged whether a reference character is inputted by the user (S36). When a reference character is inputted by the user (S36: Yes), an error title and operation information corresponding to the inputted reference character are read out from the error display memory 331 (S28). Thereafter, the present display is erased, and the detail display screen image 161 with the error title and operation information as read out is displayed on the LCD 16 (S29). Then, the present process goes to S12.

In the meantime, when the clear key is not selected (s34: No), and any reference character is not inputted by the user (S36: No), it is judged whether either the left direction key or right direction key of the input keys 15 is selected (S38).

When either the left direction key or right direction key is selected (S38:Yes), the display in the lower operation information area 1612 (see FIG. 4B) on the detail display screen image 161 is scrolled in a direction specified by the selected direction key (S40). Thereafter, the present process goes to S12.

According to the screen display process, owing to the display of the abbreviation displayed on the abbreviation display screen image 160 when two or more errors are caused, the user can visually recognize the two or more errors as being caused. At the same time, the user can also visually recognize the error titles that are the original information of the abbreviations. Consequently, even in such a limited display area, the user can quickly grasp a lot of information.

Further, in response to a reference character being inputted by the user, the abbreviation corresponding to the inputted reference character is displayed on the detail display screen image 161. Therefore, the user can grasp what kind of error is caused and operation information regarding operations required for releasing the caused error, quickly and easily.

Additionally, in response to the clear key being pressed by the user while the detail display screen image 161 is being displayed, the abbreviation display screen image 160 is displayed. Hence, the user can promptly reconfirm all the two or more errors as currently being caused.

Next, referring to FIGS. 6 to 7, a second embodiment according to aspects of the present invention will be described. In the aforementioned first embodiment, the image forming device 1 is configured to display the abbreviation display screen image 160 when two or more error are detected. In contrast, in the second embodiment, the image forming device 1 is configured to display either the abbreviation display screen image 160 or a below-mentioned simplified display screen image 162

It is noted that the following explanation will be given on the premise that an external and electrical configurations of an image forming device 1 in the second embodiment are the same as those of the image forming device 1 in the first embodiment. Hereinafter, the same reference characters will be given to the same portions as those in the first embodiment, and explanations about the same portions will be omitted. The following description will be given to points different from the first embodiment.

FIG. 6A is an example of the simplified display screen image 162 displayed on the LCD 16 of the image forming device 1 in the second embodiment. As shown in FIG. 6A, the simplified display screen image 162 is configured with an upper error number display area 1621 to display the number of currently-caused errors (an example of a numerical number of concluded conditions) and lower title display area 1622 to display abbreviations and error titles corresponding to the currently-caused errors. Namely, when two or more errors are detected, the number of the caused errors is displayed as well as the error titles thereof.

Further, in the present embodiment, when the simplified display screen image 162 is displayed on the LCD 16, either the left direction key or right direction key of the input keys 15 is selected, the display in the title display area 1622 is only scrolled in a direction specified by the selected direction key. Thereby, firstly, the user can visually recognize the upper area and grasp the total number of the currently-caused errors. Further, the user can also visually recognize necessary error titles by scrolling the lower area as required. Thus, even though a lot of errors are caused, the user can promptly confirm the currently-caused errors.

FIG. 6B schematically shows switchable screen images to be displayed as the simplified display screen image 162 on the LCD 16. Firstly, the simplified display screen image 162 as described with reference to FIG. 6A is displayed.

As shown in FIG. 6B, in the title display area 1622 at the lower side of the simplified display screen image 162, each abbreviation is displayed in a manner associated a reference character. Then, in the same fashion as described with reference to FIG. 4B, in response to the reference number being inputted by the user, detailed information regarding the abbreviation corresponding to the inputted reference character is displayed on the detail display screen image 161. It is noted that in FIG. 6B, a detail display screen image 161 to be displayed in case where the reference character "1" is inputted is only exemplified. However, when another reference character is inputted, the detail display screen image 161 of an abbreviation corresponding to the inputted reference character is displayed. Furthermore, when another reference character is inputted while any detail display screen image 161 is being displayed, the present display is changed to a detail display screen image 161 of an abbreviation corresponding to the inputted reference character.

Thereby, it is possible to display necessary information in the display area quickly and easily by inputting an intended reference character with reference to the simplified display screen image 162.

In addition, in response to the clear key of the input keys 15 being pressed while the detail display screen image 161 is displayed, the present display on the LCD 16 is switched from the detail display screen image 161 to the simplified display screen image 162. Thereby, when the user wishes to reconfirm all the currently-caused errors, or to know a reference character for making an intended detail display screen image 161 display, it is possible to return to the simplified display screen image 162 quickly and easily.

It is noted that when some of the currently-caused errors are overcome while the switching between the detail display screen image 161 and the simplified display screen image 162 is performed, and it becomes possible to display the abbreviation display screen image 160, the present display on the LCD 16 is switched from the simplified display screen image 162 to the abbreviation display screen image 160 (see FIG. 4). Details about this switching operation will be described with reference to FIG. 7.

FIG. 7 is a flowchart showing a screen display process to be executed by the image forming device 1 of the second embodiment. The same reference characters will be given to the same steps in the screen display process as those in the screen display process (see FIG. 5) by the image forming device 1 of the first embodiment, and explanations about the same steps will be omitted or simplified.

As shown in FIG. 7, in the screen display process to be executed by the image forming device 1 of the second embodiment, when an error is caused (S4: Yes), and the caused error includes two or more errors (S6: No), firstly, an abbreviation and error title of each caused error are read out from the error display memory 331 (S17). Then, it is judged whether to display the aforementioned simplified display screen image 162 (see FIG. 6), based on the number of characters constituting the abbreviations 3312 of the currently-caused errors. Specifically, the number of characters to be displayed in the abbreviation area 1601 is determined by adding, to the total number of the characters constituting the abbreviations of the currently-caused errors, the number of reference characters to be added to the respective abbreviations (S17*a*).

Subsequently, it is judged whether the number of characters as determined in S17*a* is equal to or more than the maximum number of characters displayable in the abbreviation area 1601 (S17*b*). When the judgment in S17*b* is affirmative (S17*b*: Yes), the simplified display screen image 162 (see FIG. 6) is displayed on the LCD 16 (S19). Meanwhile, when the judgment in S17*b* is negative, namely, when it is judged that the simplified display screen image 162 is not to be displayed (S17*b*: No), the abbreviation display screen image 160 (see FIG. 4) with the abbreviation and error title as read out in S17 is displayed on the LCD 16 (S18).

It is noted that the number of characters displayed in the abbreviation area 1601 has correlation with the number of detected errors. In other words, the more errors are detected, the more the number of characters displayable in the abbreviation area 1601 is likely to be increased. Therefore, instead of the judgment in S17*b*, for example, it may be judged whether the number of detected errors is equal to or more than a predetermined value. In this case, the simplified display screen image 162 is displayed in S19 in case where the judgment is affirmative, while the abbreviation display screen image 160 is displayed in S18 in case where the judgment is negative.

Next, it is judged whether any error is released (S20). When it is judged that any error is released (S20: Yes), the present process goes back to S4. Then, when an error as being currently caused is detected (S6: Yes), the detail display screen image 161 is displayed (S10). Meanwhile, when two or more errors are detected (S6: No), and the judgment in S17*b* is negative (S17*b*: No) with an error being released (i.e., the number of currently-caused errors being reduced), even though the abbreviation display screen image 162 is displayed until then, the present display is changed to the simplified display screen image 160.

In the meantime, when any error is not released (S20: No), it is judged whether a new error is caused, based on signals outputted by the remaining toner sensor 23, waste toner detecting sensor 24, and recording paper sensor 25 (S24). When it is judged that a new error is caused (S24: Yes), the present process goes back to S17. When the judgment in S17*b* is affirmative (S17*b*: Yes) with a new error being caused (i.e., the number of currently-caused errors being increased), even though the abbreviation display screen image 160 is displayed on the LCD 16, the present display is changed to the simplified display screen image 162.

Meanwhile, when any new error is not caused (S24: No), it is judged whether a reference character is inputted by the user (S26). When any reference character is not inputted by the user (S26: No), it is judged whether either the left direction key or right direction key of the input keys 15 is selected (S30).

When it is judged that either the left direction key or right direction key of the input keys 15 is selected (S30: Yes), the display in the lower area of the abbreviation display screen image 160 or simplified display screen image 162 is scrolled in a direction specified by the selected direction key (S32), and the present process goes back to S17.

When a reference character is inputted by the user while the aforementioned steps are repeated in this manner (S26: Yes), an error title and operation information corresponding to the inputted reference character are read out from the error display memory 331 (S28). Thereafter, the screen image displayed until then is cleared, and the detail display screen image 161 with the error title and operation information as read out is displayed on the LCD 16 (S29). Then, the present process goes back to S12.

When the error is not released (S12: No), and both the judgments in S14 and S16 are negative (S14: No, and S16: No), it is judged whether the clear key of the input keys 15 is selected (S34). When the clear key is selected (S34: Yes), the present process goes to S17, and the abbreviation display screen image 160 or simplified display screen image 162 is displayed (S18 or S19).

According to the image forming device 1 of the second embodiment, when two or more errors are detected, the number of the caused errors is displayed in the simplified display screen image on the LCD 16 as well as error titles of the caused errors. Therefore, the user can promptly grasp a lot of information even in such a limited display area. For example, even when a lot of errors are concurrently caused, and error titles of only part of the caused errors can be displayed, the user, who has recognized the number of the caused errors, may understand appropriate operations to release the errors, or presume errors that are not shown on the LCD 16, based on the number of the caused errors.

In addition, when a plurality of errors are detected, it is judged whether to display the simplified display screen image 162 in S19, based on the numbers of characters constituting a plurality of abbreviations corresponding to the plurality of errors. Then, when it is not judged that the simplified display screen image 162 is to be displayed in S19, the abbreviation display screen image 160 is displayed on the LCD 16. Hence, the display suitable for the number of the characters of the abbreviations is shown. For instance, when the number of the caused errors is small, and the judgment in S17*b* is negative (S17*b*: No), the abbreviation display screen image 160 is displayed instead of the simplified display screen image 162. Thereby, abbreviations of a larger number of errors can be displayed. Consequently, the user can grasp more information.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

Further, in the above embodiments, the image forming device 1 provided with a function of forming an image has been described as an example of the display device according to aspects of the present invention. However, the present invention may be applied not only to such an image forming device but also to a device configured with a display area for displaying information.

Further, in the above embodiments, the display scroll is implemented based on the user's operation. However, in any of S10 of the screen display process (see FIG. 6), S29 in which the detail display screen image 161 is displayed, S18 in which the simplified display screen image 160 is displayed, and S19 in which the simplified display screen image 162 is displayed, only the display in the lower area may automatically be scrolled without any user's operation.

Additionally, in the above embodiments, the display in the information display area 1602 at the lower side of the abbreviation display screen image 160 is scrolled. However, a plurality of pieces of display information to be displayed in the information display area 1602 may alternately be displayed at intervals of a predetermined time period. In the same manner, error titles to be displayed in the title display area 1622 of the simplified display screen image 162 may alternately be displayed at intervals of a predetermined time period.

Further, the abbreviation display screen image 160 in the above embodiments is configured to display the abbreviations and error titles. However, the abbreviation display screen image 160 may be configured to display the number of currently-caused errors in addition to the abbreviations and error titles.

FIG. 8 schematically shows an abbreviation display screen image 160 in a modification according to aspects of the present invention. As shown in FIG. 8, the number of currently-caused errors 1603 may be displayed in the abbreviation area 1601. Thereby, the user can promptly grasp the number of currently-caused errors.

Further, in the abbreviation display screen image 160 (see FIG. 4A) of the embodiments, each abbreviation is displayed with a reference character attached thereto in the abbreviation area 1601. However, as shown in FIG. 8, each abbreviation may be displayed without any reference character attached thereto in the abbreviation area 1601 of the modification. In this case, a reference character may be attached only to each of the abbreviations and error titles displayed in the information display area 1602. Thereby, since there can be displayed more characters in the abbreviation area 1601, a lot of abbreviations can be displayed side by side.

Furthermore, in the above embodiments, abbreviations and error titles are displayed in the information display area 1602 at the lower side of the abbreviation display screen image 160. However, only error titles may be displayed in the information display area 1602, without displaying the abbreviations.

Additionally, in the above second embodiment, the simplified display screen image 162 is configured to display the number of currently-caused errors and abbreviations. Instead, for example, the simplified display screen image 162 may be configured to display the total number of currently-caused errors and error titles.

What is claimed is:

1. A display device, comprising:
- a display area configured to display information therein;
- an information storing unit configured to store therein a plurality of event titles respectively representing one or more events known to occur in an image forming apparatus;
- an abbreviation storing unit configured to store therein an abbreviation corresponding to each of the plurality of event titles;
- a processor; and
- memory having instructions stored therein that, when executed by the processor, cause the processor to operate as:
  - an event detecting unit configured to detect one or more events that have occurred in the image forming apparatus as a subject to be displayed in the display area;
  - a judging unit configured to judge whether only one event has been detected or whether multiple events have been detected by the event detecting unit; and
  - a first control unit configured to:
    - in a first case where it is judged by the judging unit that the event detecting unit has detected multiple events, (i) acquire a first group of event titles representing a first group of events detected by the event detecting unit and a first group of abbreviations thereof from the information storing unit and the abbreviation storing unit, respectively, and (ii) display each acquired event title and each acquired abbreviation thereof in the display area,
    - in a second case wherein it is judged by the judging unit that the event detecting unit has detected only one event, acquire and display one event title representing one event detected by the event detecting unit without acquiring and displaying the abbreviation thereof, and
    - in a third case where it is judged by the judging unit that the event detecting unit has detected a second event when only the one event title is displayed, (i) acquire a first abbreviation of the one event title, (ii) acquire a second event title representing the second event and a second abbreviation of the second event title, and (iii) display the first abbreviation, the second abbreviation, and the second event title in addition to the one event title.

2. The display device according to claim 1, further comprising:
- an input unit configured to accept an input therethrough,
- wherein the first control unit causes to be displayed, in the display area, each of the abbreviations with a reference character associated therewith, and
- wherein the memory comprises further instructions stored therein that, when executed by the processor, cause the processor to further operate as:

a second control unit configured to:

clear the one event title or the first group of event titles and the first group of abbreviations thereof displayed by the first control unit, acquire second information regarding an abbreviation associated with a reference character from the information storing unit, and display the second information in the display area, in response to an input for selecting the reference character being accepted through the input unit.

3. The display device according to claim 2, wherein the memory comprises further instructions stored therein that, when executed by the processor, cause the processor to further operate as:

a third control unit configured to:

clear the second information acquired by the second control unit, acquire different second information regarding an abbreviation associated with a second reference character from the information storing unit, and display the different second information in the display area, in response to the second reference character being selected through the input unit while the second information acquired by the second control unit is being displayed.

4. The display device according to claim 2, wherein the memory further comprises instructions stored therein that, when executed by the processor, cause the processor to further operate as:

a display switching unit configured to clear the second information, and to display each acquired event title and abbreviation thereof in the display area, in response to a predetermined input being accepted through the input unit while the second information is being displayed.

5. The display device according to claim 2, wherein the second information regarding the abbreviation associated with the reference character selected through the input unit includes error information representing an error being caused and operation information representing an operation to release the error.

6. The display device according to claim 1, wherein the display area is divided into a first area and a second area, wherein the first control unit displays each acquired event title in the first area, and wherein the first control unit displays the abbreviation corresponding to each acquired event title in the second area.

7. The display device according to claim 1, wherein the information storing unit includes error information regarding an error known to occur, and wherein the event detecting unit is configured to detect the error.

* * * * *